Sept. 8, 1970          R. CHUTE ET AL          3,527,472

VEHICLE SAFETY APPARATUS

Filed Jan. 23, 1968          2 Sheets-Sheet 1

INVENTOR.
RICHARD CHUTE
DAVID P. HASS
BY
*Young, Flynn & Tarolli*
ATTORNEYS

Sept. 8, 1970 R. CHUTE ET AL 3,527,472
VEHICLE SAFETY APPARATUS
Filed Jan. 23, 1968 2 Sheets-Sheet 2
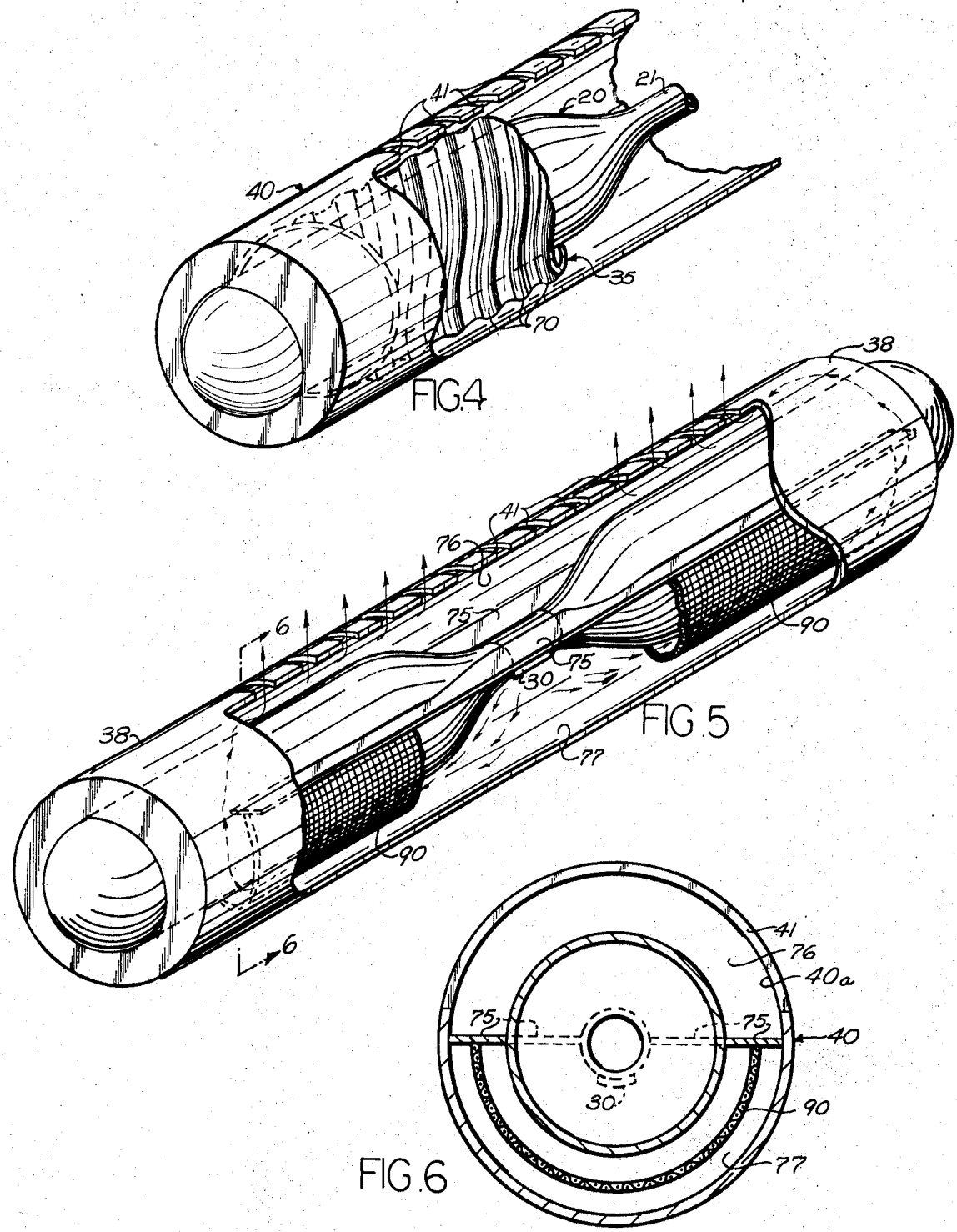
INVENTOR.
RICHARD CHUTE
DAVID P. HASS
BY
Young, Flynn & Tarolli
ATTORNEYS United States Patent Office 3,527,472
Patented Sept. 8, 1970

3,527,472
VEHICLE SAFETY APPARATUS
Richard Chute, Huntington Woods, and David Peter
Hass, Detroit, Mich., assignors to Eaton Yale & Towne
Inc., Cleveland, Ohio, a corporation of Ohio
Filed Jan. 23, 1968, Ser. No. 699,924
Int. Cl. B60r 21/00
U.S. Cl. 280—150                    7 Claims

ABSTRACT OF THE DISCLOSURE

A vehicle safety apparatus includes an inflatable confinement. The confinement is inflated to protect an occupant of a vehicle from forceful impact with a structural part of the vehicle during a collision. The confinement is inflated by the flow of fluid from a fluid reservoir to the confinement, and means is disposed in the flow of fluid to provide a turbulent fluid flow to thereby minimize the noise created by the fluid flow.

---

The present invention relates to an apparatus for minimizing the noise created by fluid flow and, in particular, relates to a vehicle safety apparatus which includes an inflatable confinement which is inflated by the flow of fluid from a fluid reservoir and wherein a means is interposed in the fluid flow to minimize the sound created by the fluid flow.

Known vehicle safety devices include inflatable confinements which have a contracted inoperative position and an expanded operative position. The confinement is expanded to its operative position by the flow of fluid into the confinement. The flow of fluid into the confinement has created a sound which is objectionable and which may reach an uncomfortable decibel level for human beings.

Accordingly, the principal object of the present invention is the provision of a new and improved vehicle safety apparatus which includes a confinement which is inflated by the flow of fluid into the confinement and wherein the apparatus is constructed so as to minimize or limit the noise created by the flow of fluid to the confinement.

A further object of the present invention is the provision of a new and improved vehicle safety apparatus, as noted in the next preceding paragraph, wherein means is interposed in the flow of fluid from a fluid reservoir for muffling or minimizing the noise created by the flow of fluid to the confinement.

A still further object of the present invention is the provision of a new and improved vehicle safety apparatus which includes an inflatable confinement for protecting an occupant of a vehicle from a forceful impact with a structural part of the vehicle during a collision, and wherein the confinement is inflated by the flow of fluid to the confinement and means is provided for creating a turbulent fluid flow from the fluid reservoir to the confinement which thereby minimizes the sound created by the fluid flow.

A further object of the present invention is the provision of a new and improved safety apparatus, as noted in the next preceding paragraph, wherein the turbulent flow is produced by means which directs at least portions of the fluid flow transverse to the general direction of fluid flow.

Another object of the present invention is the provision of a new and improved apparatus which includes a fluid reservoir which has a diffuser member associated therewith and means providing an opening in the reservoir for the flow of fluid therefrom, and wherein a member having a corrugated portion encircles at least a portion of the reservoir so that the corrugations are located in the path of fluid flow and provide a turbulent flow.

Still another object of the present invention is the provision of a new and improved apparatus wherein a fluid reservoir and diffuser member are operatively associated and means is provided for effecting the formation of an opening in the fluid reservoir to provide for flow of fluid therefrom, and wherein a tubular screen member encircles the fluid reservoir and is interposed between the fluid reservoir and the diffuser member in the flow of fluid and operates to spread the fluid flow and provide a turbulent flow.

Yet another object of the present invention is the provision of a generally cylindrical fluid reservoir and a diffuser member which encircles the fluid reservoir and wherein means is associated with the reservoir, and wherein the fluid flow is directed generally axially of the reservoir as the fluid flows from the reservoir, and means is provided for creating a turbulent fluid flow as the fluid flows generally axially of the reservoir.

Further objects and advantages of the present invention will be apparent to those skilled in the art to which it relates from the following detailed description of preferred embodiments thereof made with reference to the accompanying drawing forming a part of this specification and in which:

FIG. 4 is a view of a modified form of the present invention;

FIG. 5 is a view of a still further modified form of the present invention; and

FIG. 6 is a sectional view taken approximately along the section line 6—6 of FIG. 5.

The present invention relates to an improved vehicle safety apparatus. The vehicle safety apparatus may be used in any type of vehicle where it is desired to restrain or control the movement of the occupant of the vehicle during a collision for safety purposes. The safety apparatus may be utilized in vehicles, such as automobiles, trucks, airplanes, etc.

Figure 1:
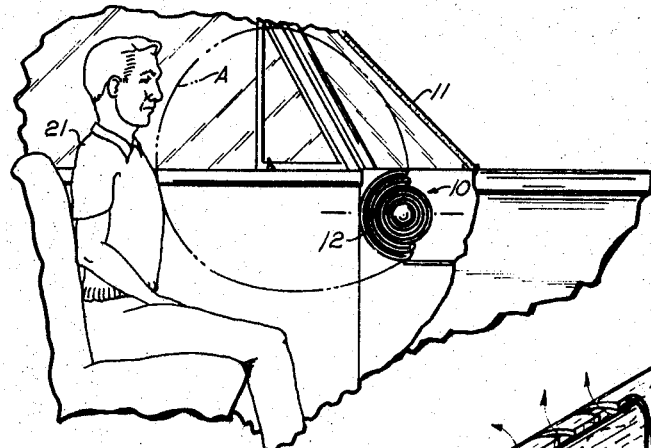
FIG. 1 is a schematic fragmentary illustration of a vehicle embodying the present invention.

For purposes of illustration and as representative of the present invention, a vehicle safety apparatus 10 is illustrated in FIG. 1 as applied to an automotive vehicle 11. The vehicle safety apparatus 10 includes an inflatable confinement 12 having a contracted inoperative position, as illustrated in full lines in FIG. 1, and an expanded operative position, designated A and indicated by the dash line in FIG. 1. The confinement 12 is constructed of a material which, when in its contracted folded condition, is located in the dashboard of the vehicle 11. The confinement may be otherwise located in the vehicle, such as in the back of the front seat or in the doors, or in various different locations in the vehicle.

The confinement 12 is inflated to its expanded condition in response to the vehicle 11 encountering a collision condition. When the vehicle 11 encounters a collision condition, the confinement is inflated by the flow of fluid from a reservoir 20 to the confinement 12 to effect inflation of the confinement 12. When the confinement 12 is inflated, it provides a restraint against forward movement of the occupant 21 of the vehicle 11 so as to prevent a forceful impact of the occupant 21 with a structural part of the vehicle 11.

As noted above, the confinement 12 is inflated by the flow of fluid from the fluid reservoir 20 to the confinement 12. The fluid reservoir 20 comprises a generally elongate cylindrical member having a necked-down or reduced cross-sectional portion 21. The reduced cross-sectional portion 21 of the reservoir provides an area where the walls of the reservoir are of a reduced thickness. The opposite end portions 22, 23 of the reservoir 20 contain the major volume of fluid in the reservoir 20. The opposite ends 23a and 22a of the reservoir 20 are closed. A suitable means is provided and generally designated 30 for effecting the formation of an opening in the portion 21 of the reservoir 20. The means 30 generally comprises an explosive device which when ignited effects the formation of the opening. The explosive may be ignited in any suitable manner and is preferably ignited by the flow of current through a detonator which effects detonation of the explosive charge. The current may flow through the detonator upon a switch being actuated in response to a collision condition occurring.

Figure 2:
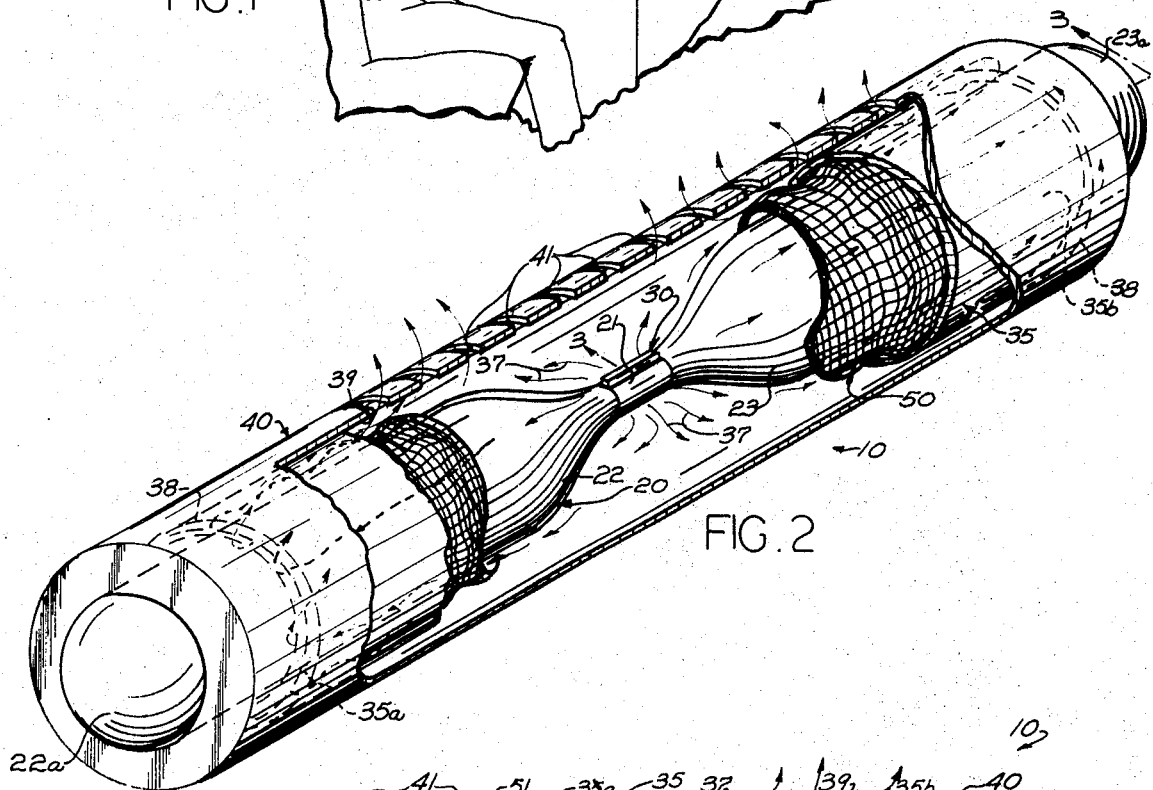
FIG. 2 is a view with parts broken away illustrating a vehicle safety apparatus embodied in the vehicle of FIG. 1.

The opening which is formed in the reservoir 20 is formed in the portion 21 thereof and as the fluid flows through the opening, it flows generally axially of the reservoir 20 in opposite directions from the opening, as indicated by the arrows in FIG. 2. The flow is directed generally axially by a baffle member, generally designated 35. The baffle member 35 comprises a tubular member which is supported in surrounding relation to the reservoir 20 and which has its opposite ends 35a, 35b terminating short of the associated end of the reservoir 20. As designated by the arrows in FIG. 3, the fluid flows through the area 37 between the outer diameter of the reservoir 20 and the inner diameter of the tubular baffle member 35.

As the fluid flows from the opposite ends of the baffle member, it flows into opposite annular end chambers, designated 38. The annular end chambers 38 are defined in part by a diffuser member 40 and by the reservoir 20. The annular chambers 38 at the opposite ends of the diffuser member 40 effect a turning of the flow of fluid into an axially extending chamber 39 which is defined by the outer diameter of the tubular member 35 and the inner diameter of the diffuser member 40.

The diffuser member 40 is a generally tubular member within which the fluid reservoir 20 and the baffle member 35 are located and which is secured in position in association with the reservoir 20 in any suitable manner. The diffuser member 40 is provided with a plurality of slots 41 on the diametrical side thereof opposite the side on which the explosive 30 is mounted on the reservoir 20. The openings 41 provide for flow of fluid from the chamber 39 outwardly of the diffuser member 40 and to the confinement 12. The flow of fluid to the confinement 12 effects inflation of the confinement 12.

Figure 3:
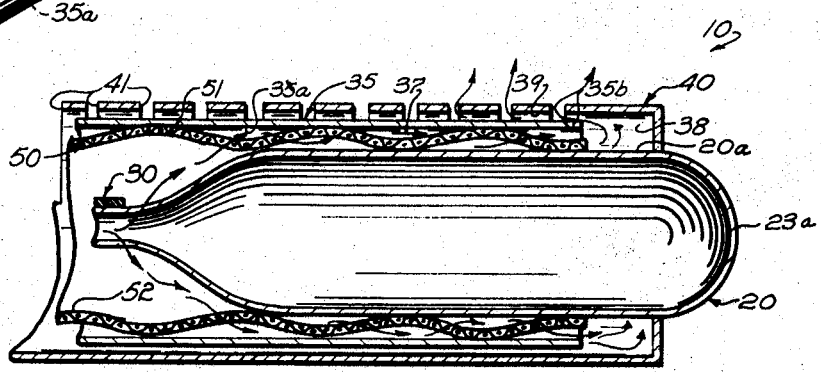
FIG. 3 is a fragmentary sectional view of a portion of the apparatus shown in FIG. 2 and taken approximately along section line 3—3 of FIG. 2.

The safety apparatus 11 includes means disposed in the flow of fluid for minimizing the sound created by the flow of the fluid from the opening in the fluid reservoir 20. The means for minimizing the noise or sound of the flow of fluid may take different forms. As illustrated in FIG. 3, the means for minimizing the noise comprises a tubular screen member 50. The screen member 50 is located in encircling relation to the fluid reservoir 20 and within the baffle member 35. The tubular screen member 50 has raised portions 51 thereon and indented portions 52 thereon. The raised portions 51 engage the internal surface 35a of the tubular member 35 and the indentations 52 engage the outer surface 20a of the fluid reservoir 20. The engagement of the projection 51 with the surface 35a and the engagement of the indentation 52 with the surface 20a of the reservoir 20 provide support for the screen member 50 in the position illustrated in FIGS. 1 and 3 in encircling relation to the reservoir 20 and within the baffle member 35.

As fluid flows from the opening formed in the portion 21 of the reservoir 20, it flows through the screen member 50. As the fluid flows through the screen member 50, the fluid flow is broken or dispersed somewhat by the screen wire, and it is directed generally axially of the reservoir 20 by the baffle member 35, as described hereinabove. As the fluid flows along the axis of the reservoir 20, the flow continuously encounters screen wire elements comprising the screen and is thus continuously subjected to a dispersing action which creates a highly turbulent flow and minimizes or muffles the sound of fluid flowing from the opening in the reservoir 20. The muffling of the sound is of sufficient extent to maintain the sound within the human tolerance level.

The modification of the present invention illustrated in FIG. 4 also incorporates means for muffling or minimizing the noise created by the sonic flow of fluid from the reservoir 20. Moreover, the means utilized to muffle or minimize the sound of the flow provides a turbulent fluid flow from the opening formed in the reservoir 20 in a manner similar to that of the screen member 50. In the modification of FIG. 4 the turbulent fluid flow is provided by the baffle member 35 itself. In the modification shown in FIG. 4, the baffle member is provided with a plurality of corrugations 70 thereon. The fluid as it flows from the opening formed in the the reservoir 20, flows axially of the reservoir 20 and encounters the corrugations 70 on the baffle member 35. The corrugations on the baffle member 35 direct the fluid flow generally transverse of the general direction of flow, that is, generally transverse to the axis of the reservoir 20, and causes a highly turbulent flow which effects a minimizing of the noise created by the fluid flow.

The embodiment of the present invention illustrated in FIGS. 5 and 6 also is constructed so as to minimize the noise created by the sonic flow of fluid from the reservoir 20 into the confinement 12. In the embodiment illustrated, the reservoir 20 has a pair of ribs 75 projecting outwardly therefrom at diametrically opposite locations. The ribs 75 engage the internal surface 40a of the diffuser member 40. The rib members 75, diffuser member 40, and reservoir 20 define two annular chambers 76, 77 which are located at diametrically opposite sides of the reservoir 20. The ribs extend axially of the diffuser member 40 and of the reservoir 20 and terminate short of the ends of the diffuser member 40, thus providing the annular chambers 38 at the opposite ends of the reservoir 20. The annular chambers 38 encircle the diffuser member 40 and communicate the diametrically opposite chambers 76, 77 defined by the rib members 75 and by the outer diameter of the reservoir and the inner diameter of the diffuser member.

The explosive 30 which is utilized to effect opening of the portion 21 of the reservoir 20 is located within the chamber 77. Thus, the fluid initially flows into the chamber 77 from the reservoir 20. As the fluid flows into the chamber 77, it is directed generaly axially thereof by the diffuser member 40. The fluid then flows into the opposite annular chambers 38 and is directed by the opposite ends of the diffuser member 40 into the chamber portion 76 and again axially of the reservoir 20. The openings 41 in the diffuser member 40 intersect or communicate with the chamber portion 76 and the fluid flows from the openings 41 as it flows along the chamber portion 76.

The construction illustrated in FIGS. 5 and 6 incorporates means for muffling or minimizing the noise created by the sonic flow of fluid from the opening in the reservoir 20. The fluid as it flows from the opening in the reservoir 20, as noted hereinabove, flows axially of the reservoir 20 in opposite directions from the opening through the chamber portion 77. As illustrated in the drawing, means for minimizing the noise created by the flow is disposed in the flow of fluid, and specifically is disposed in the chamber 77. The means which is interposed in the flow of fluid from the reservoir 20 comprises a screen member 90 of a generally arcuate shape. The screen member 90 operates in much the same manner as the screen member 50 described hereinabove in connection with FIG. 3. The fluid flow through the screen member 90 results in a dispersion of the fluid flow by the wires forming the screen member 90 and as a result a highly turbulent fluid flow is provided by the screen member. As a result, the screen member 90 does function to muffle the sound created by the sonic flow of fluid from the opening in the reservoir 20 and minimizes this sound.

In view of the foregoing, it should be apparent that applicant has provided a new and improved safety apparatus and a new and improved means for muffling the sound created by the sonic flow of fluid from an opening in a reservoir. Moreover, it should also be apparent that certain modifications, changes, and adaptations may be made of the present invention and it is intended to cover all such modifications, changes, and adaptations which come within the scope of the appended claims.

Having described our invention, we claim:

1. Vehicle safety apparatus for protecting an occupant of a vehicle during a collision, said apparatus comprising a confinement having a contracted inoperative position and an expanded operative position, a source of fluid for expanding said confinement, means for effecting flow of fluid from said fluid source to expand said confinement, and means interposed in the path of said flow of fluid from said fluid source for muffling noise created by said fluid flow to expand said confinement, said fluid source comprising a reservoir containing a supply of fluid, said means for providing for fluid flow from said source comprising means for effecting the formation of an opening in said fluid reservoir to provide for fluid flow therefrom, and said means for muffling noise created by said fluid flow comprising a baffle member interposed in said fluid flow and having corrugations thereon which direct said flow generally transverse to the general direction of said flow.

2. Vehicle safety apparatus for protecting an occupant of a vehicle during a collision, said apparatus comprising a confinement having a contracted inoperative position and an expanded operative position, a source of fluid for expanding said confinement, means providing for flow or fluid from said source to expand said confinement, a diffuser member operatively associated with said fluid source and at least in part defining a chamber therebetween, said diffuser member having at least one opening therein providing for fluid flow from said chamber to said confinement, means disposed in said chamber for muffling noise created by said flow of fluid, said fluid source comprising an elongate member, and a baffle member encircling said fluid reservoir and located in said chamber, said diffuser member encircling said baffle member and defining a chamber therebetween, and said means for muffling noise comprising a member interposed between said baffle member and said reservoir for providing turbulence in the fluid flow.

3. Vehicle safety apparatus as defined in claim 2 wherein said last-mentioned member comprises a tubular screen which encircles said fluid source and which includes projections some of which engage an internal surface of said baffle member and some of which engage an external surface of said fluid source.

4. Vehicle safety apparatus for protecting an occupant of a vehicle during a collision, said apparatus comprising a confinement having a contracted inoperative position and an expanded operative position, a source of fluid for expanding said confinement, means providing for flow of fluid from said source to expand said confinement, a diffuser member operatively associated with said fluid source and at least in part defining a chamber therebetween, said diffuser member having at least one opening therein providing for fluid flow from said chamber to said confinement, means disposed in said chamber for muffling noise created by said flow of fluid, said fluid source comprising an elongate member and said means for muffling noise created by said fluid flow comprising a baffle member encircling said fluid source and defining a chamber therebetween, said fluid flowing from said fluid source and around said baffle member, said baffle member including corrugations thereon which direct fluid flow generally transverse to the longitudinal axis of said fluid source.

5. Vehicle safety apparatus for protecting an occupant of a vehicle during a collision, said apparatus comprising a confinement having a contracted inoperative position and an expanded operative position, a source of fluid for expanding said confinement, means providing for flow of fluid from said source to expand said confinement, a diffuser member operatively associated with said fluid source and at least in part defining a chamber therebetween, said diffuser member having at least one opening therein providing for fluid flow from said chamber to said confinement, means disposed in said chamber for muffling noise created by said flow of fluid, said fluid source comprising a generally elongate member, means interconnecting said resorvoir and said diffuser member at diametrically opposite locations and separating said chamber into diametrically opposite chamber portions, said fluid flowing from said fluid source into one chamber portion and from said one chamber portion into the other chamber portion, said at least one opening in said diffuser communicating with said other chamber portion, and said means for muffling said noise being located in one of said chamber portions.

6. Vehicle safety apparatus as defined in claim 5 wherein said means for muffling noise comprises a screen member located in one of said chamber portions.

7. Vehicle safety apparatus for protecting an occupant of a vehicle during a collision, said apparatus comprising a confinement having a contracted inoperative position and an expanded operative position, a source of fluid for expanding said confinement, means for providing for flow of fluid from said source to expand said confinement, a diffuser member operatively associated with said fluid source and at least in part defining a chamber therebetween, said diffuser member having at least one opening therein providing for fluid flow from said chamber to said confinement, a member disposed in said chamber for muffling noise created by said flow of fluid, said member having portions spaced from said source while fluid is flowing therefrom and said portions extending at least ninety degrees circumferentially therearound and effecting a turbulent fluid flow through said chamber to provide for noise muffling.

References Cited

UNITED STATES PATENTS

| 2,065,343 | 12/1936 | Moore et al. | 181—55 |
| 2,334,263 | 11/1943 | Hartwell | 181—55 |
| 2,962,110 | 11/1960 | Depman | 181—60 |
| 2,995,199 | 8/1961 | Myers | 181—55 |
| 3,243,010 | 3/1966 | Flynn | 181—55 |
| 3,411,807 | 11/1968 | Carey et al. | 280—150 |

KENNETH H. BETTS, Primary Examiner

U.S. Cl. X.R.

181—55